United States Patent [19]
Wakatsuki et al.

[11] 3,917,324

[45] Nov. 4, 1975

[54] PIPE JOINT

[75] Inventors: Hiroe Wakatsuki; Toshio Nishimura, both of Tokyo, Japan

[73] Assignee: Toyo Kinzoku Corporation, Tokyo, Japan

[22] Filed: Oct. 17, 1974

[21] Appl. No.: 515,722

[30] Foreign Application Priority Data
Apr. 19, 1974  Japan.............................. 49-43290
Aug. 19, 1974  Japan......................... 49-98860[U]

[52] U.S. Cl. .............. 285/341; 285/383; 285/382.7
[51] Int. Cl.² ......................................... F16L 17/00
[58] Field of Search ........ 285/382.7, 341, 342, 343, 285/383

[56] References Cited
UNITED STATES PATENTS
2,805,873  9/1957  Brennan et al. ................. 285/341 X FOREIGN PATENTS OR APPLICATIONS
845,721  8/1960  United Kingdom................. 285/341
303,479  12/1932  Italy................................... 285/341

Primary Examiner—Dave W. Arola
Attorney, Agent, or Firm—Woodhams, Blanchard and Flynn

[57] ABSTRACT

A pipe joint comprising a thin-wall metallic packing ring adapted to be deformed into an arcuate cross-sectional shape by engagement with a pair of relatively axially movable, oppositely tapered surfaces, so that the axial ends of the ring are placed in sealing engagement with the periphery of the pipe at two axially spaced positions.

5 Claims, 5 Drawing Figures

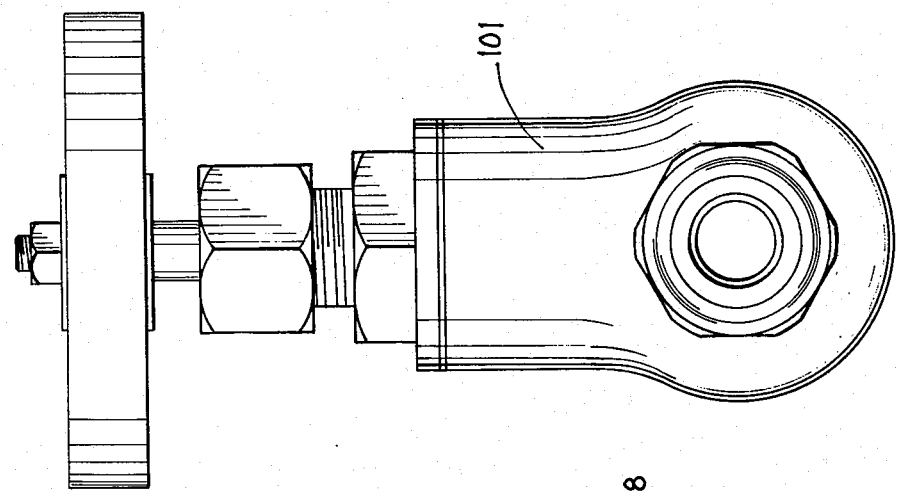
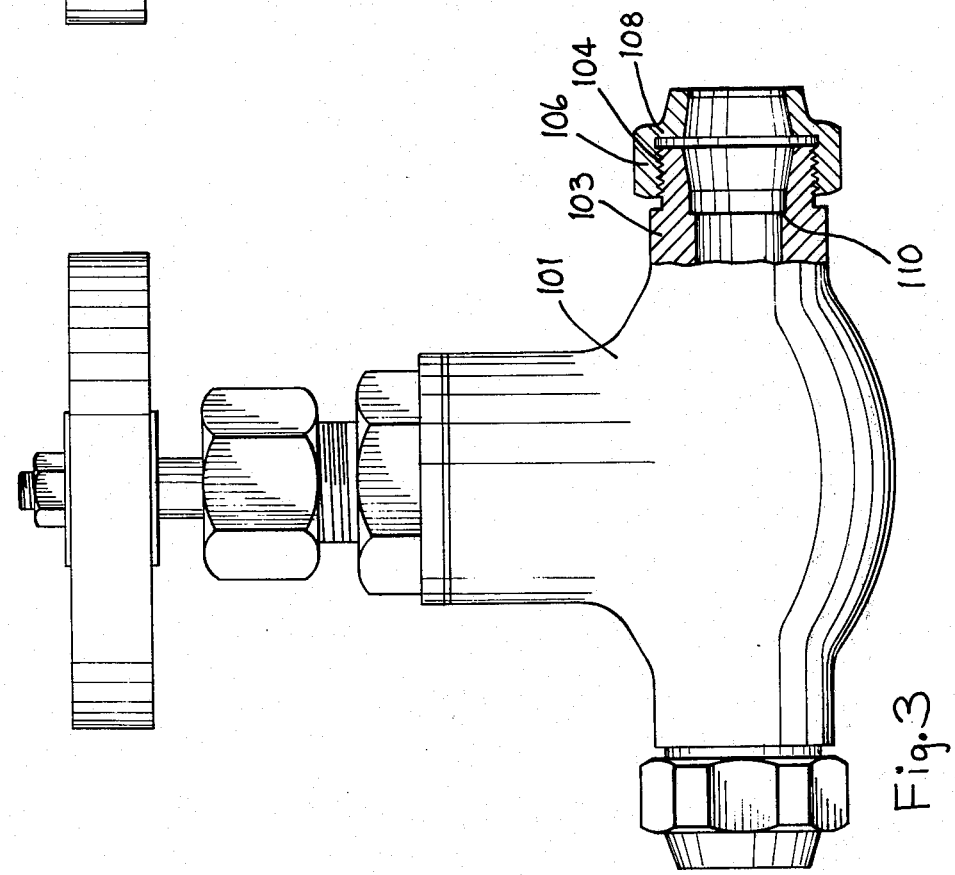

3,917,324

PIPE JOINT

BACKGROUND OF THE INVENTION

1. Field of the Invention

This invention relates to an improved pipe joint comprising a body member, a nut, a flat thin-walled metallic packing, called hereafter a metallic packing, and a ring packing.

2. Description of the Prior Art

Pipe joints such as welded, threaded, flanged or clamp-type pipe joints are used at various locations in a piping system composed of straight sections, bent sections, branched sections and so forth. In designing the piping system, the efficiency of fluid transport and the efficiency of the operation of laying the system can be improved by using appropriate pipe joints. In the conventional practice, pipes are commonly connected to each other with the use of a stainless steel clamp joint and by tightening a nut and thereby effecting a wedging action between the inner surface of a sleeve and the outer surface of the pipes. Alternatively, the pipes are connected by screwing the threaded end parts or by bolting or welding the flanged ends of the pipes. However, laborious operations are necessarily involved in these coupling systems, such as providing flanged ends on the pipes and bolting or welding the flanged ends. Moreover, after prolonged usage, liquid leakage occurs frequently at the connected portions.

An object of this invention is to overcome these defects inherent in the prior-art pipe joints.

SUMMARY OF THE INVENTION

The pipe joint of the present invention uses a special metallic sleeve packing which ensures a tight and durable sealing of the pipes and which can be replaced easily with new packings. A ring packing is also mounted at the abutment between the joint and the pipe so as to seal the fluid and prevent corrosion at the small interstice between the joint and the metallic packing.

The pipe joint of this invention is simple in structure and operates on the principle that an effective sealing can be provided by utilizing the specific properties of the metallic packing sleeve which undergoes both elastic and plastic deformation processes when a nut is tightened and the tapered part of the body member of the pipe joint and the tapered part of the nut are clamped thereto. Both ends of the metallic packing bite into the material of the pipe to provide an effective double sealing due to a substantially perfect fluid-tight contact between the metallic packing sleeve and the pipe along two circumferential lines or zones of contact. Even when the connected portion is subjected to severe mechanical vibrations, any leakage of liquid from such portion can be prevented effectively due to the resilience of the pipe, the packing, the body member of the pipe joint and the clamp nut. The pipes and the body member of the joint as well as the clamping nut are preferably made of the same metallic material. Therefore the constituent elements of the pipe joint are subjected to the same degree of thermal expansion or contraction due to changes in the temperature of the fluid, thus improving the sealing effect.

The metallic packing sleeve used in the pipe joint of the present invention can be tightened further in case the necessity arises during use, or it can be used again after the packing sleeve is disassembled once from the connecting portion. This is made possible because of the specific feature of the metallic sleeve packing, namely, that it undergoes partly elastic and partly plastic deformation and the part of the metallic packing that is subjected to elastic deformation is still capable of being again deformed elastically. In a known manner, the metallic packing material transforms from elastic deformation to plastic deformation at its yield point, whereat the plastic deformation is observed to take place in the interior of the metallic material and the crystal planes start to slide with respect to one another. And when the load against the metallic packing material is reduced gradually within the range of plastic deformation of the metallic material and at last to zero, the stress in the material comes to be comprised of a recoverable or elastic stress component and remainder is a plastic stress component. In other words, a portion or portions of the metallic packing material undergoes more or less plastic deformation even under the smallest load, but the remainder thereof remains elastic unless the stress induced in the interior of the metallic packing material exceeds a certain value.

This property of the metallic material is used advantageously in the pipe joint of the present invention. Since the metallic packing sleeve of the inventive pipe joint undergoes plastic deformation at the center and at both end portions thereof and undergoes elastic deformation at the remaining portions thereof, the metallic packing will spring back at the latter zones when the load applied to the packing has been removed. Therefore, the metallic packing can be used for sealing purposes even after it is disassembled once from the pipe joint.

The metallic packing used in the pipe joint according to the invention can be made from iron, cast iron, stainless steel, special stainless steel, copper, a copper alloy and aluminum, as the occasion may demand.

According to this invention, thread cutting, welding, brazing, flaring and similar operations are unnecessary and it is quite sufficient if the cut end of the pipe are fitted into the body member of the pipe joint and a nut is tightened for connecting the pipe to the body member. Because the thread cutting, welding or similar operations are unnecessary, in the case of a special low pressure fluid piping system, pipes of reduced wall thickness can be connected by using the inventive pipe joint, and hence the cost of the piping material can be reduced appreciably. Moreover, there is no necessity of providing or maintaining the welding margin, and the same design for the joint can be used for different fluids, provided that the pipe joint is made of suitable metal material for use with the particular fluid to be conveyed through the piping system. In addition, maintenance operations can be performed without use of welding torches, which makes unnecessary the purging of the piping system. In addition, the ring packing is mounted in a gap zone defined by the abutment of the body member and the pipe ends to shut out fluid.

BRIEF DESCRIPTION OF THE DRAWINGS

FIG. 3 is a front view, partially broken away, of a modified embodiment of the pipe joint applied for joining a valve element or piece to a pipe;

FIG. 4 is a side view of FIG. 3; and

DETAILED DESCRIPTION OF THE INVENTION

Figure 1:
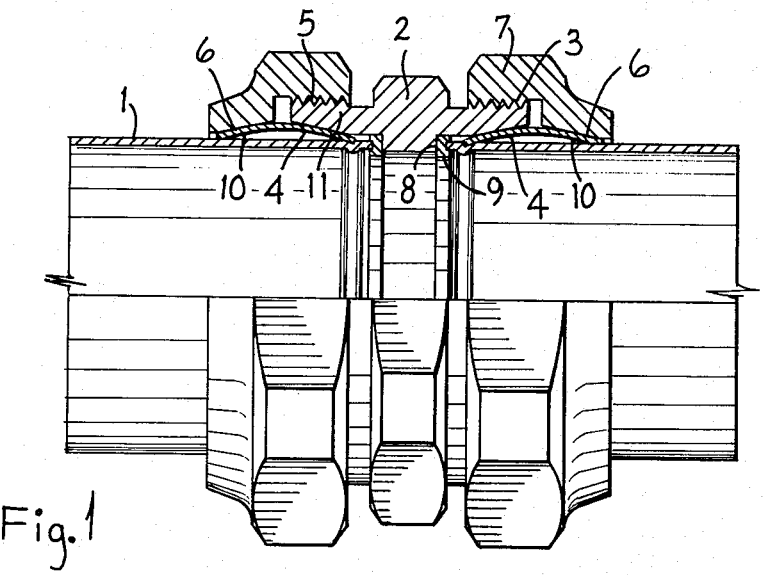
FIG. 1 is a partial longitudinal section of a preferred embodiment of the pipe joint of the present invention when in use.

In FIG. 1, the numeral 1 denotes pipes to be joined together by a pipe joint according to the present invention. The numeral 2 denotes a body member of the pipe joint which has an internal opening having a diameter conforming to that of the pipes 1. The body member 2 is provided with a pair of oppositely extending axially directed annular flange parts 11 each having a male threaded outer surface 3 and a tapered inner surface 4. The numeral 7 denotes a nut having at one axial end thereof a female threaded portion 5 for threaded engagement with the male threaded portion 3 of the main body 2, and having at the other axial end thereof a tapered internal wall portion 6. A thin-walled, flat, metallic packing sleeve 10 is fitted on the end of the pipe 1 and said packing sleeve is located inside of and is adapted for contact with the tapered inner surface 4 of the main body 2 and the tapered inner wall portion 6 of the nut 7. The numeral 9 denotes an annular resilient packing made of rubber or Teflon and fitted on the inner surface of the flange 11 between the end of the pipe 1 and the shoulder 8 on the main body 2 of the pipe joint. The packing 9 can be secured, such as by an adhesive, to the pipe end or to the shoulder 8, as the occasion may demand.

The sleeve 10 can initially be cylindrical or it can be slightly concavo-convex in longitudinal cross-section, but it is further deformed into a more pronounced concavo-convex configuration and into sealing engagement with the pipe as described below.

When assembling the pipe joint for coupling together two pipes as shown in FIG. 1, both of the nuts 7 and the metallic packing sleeves 10 are sleeved in this sequence over the ends of the respective pipes 1. The body member 2 is positioned between the ends of the pipes 1,1. Then, the ring packings 9 are placed at the end of the pipes 1,1, or on the shoulders 8 of the main body 2 of the pipe joint.

Each of the pipes 1,1 is connected to the body member 2 in the same manner as follows. The metallic packing sleeve 10 is deformed by screwing the female threaded portion 5 of the nut 7 onto the male threaded portion 3 of the main body 2 of the pipe joint. The metallic packing 10 is pressed inwardly at both its ends by the tapered part 4 of the main body of the pipe joint and the tapered part 6 of the nut 7 and is thereby deformed into an arcuate concavo-convex shape. At this time, the ends of the packing 10 are pressed against the surface of the pipe 1 along two axially spaced circumferential lines or zones of contact, while the intermediate portion of the packing 10 is radially spaced from the pipe surface. Therefore, the ends of the packing 10 and the parts adjacent to said ends are stressed strongly and will undergo a plastic deformation, while the intermediate portion of the packing is deformed only within its elastic limit. Since the packing 10 is now firmly clamped at its ends by the tapered inner wall of the flange portion 11 and the tapered inner wall 6 of the nut 7, the pipes 1,1 can be connected together in a perfectly leak-free manner.

Then, the nut 7 is further tightened, while the ends of the packing 10 are clamped by the nut 7, the main body 2 of the pipe joint and the pipe 1, the pipe 1 being thus shifted axially towards the main body 2 of the pipe joint. Thus the ring packing 9 is clamped and compressed between the abutment 8 and the end of the pipe 1 so as to avoid the risk of fluid leakage into an annular space 12 between the metallic packing 10 and the main body 2 of the pipe joint for assuring the sealing effect for the pipe 1,1.

Figure 2:
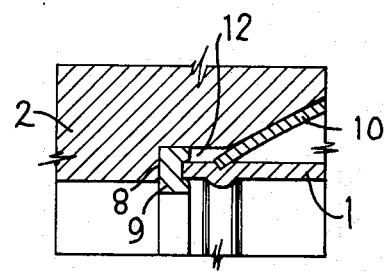
FIG. 2 is an enlarged view of a fragment of FIG. 1, with the metallic packing in the completely tightened state.

When the nut 7 is further tightened, the ends of the packing 10 are pressed inwardly and bite into the periphery of the pipe 1 under the radial component of the axial tightening force applied to the tapered faces of the nut 7 and the body member 2, whereby to form a groove in the pipe surface as shown in FIG. 2. At this point, the resistance to further tightening of the nut 7 increases sharply and the pipes 1,1 are held positively without wobbling. The tightness of the connection of the pipes 1,1 can be further increased by further tightening the nuts 7 one or one and one-half revolutions.

Figure 5:
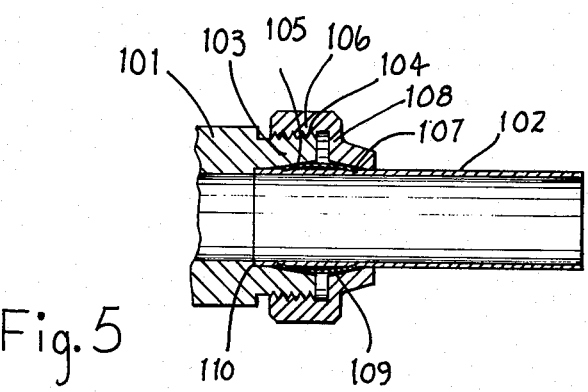
FIG. 5 is a longitudinal section showing a pipe connected to a valve piece with the use of the pipe joint of FIG. 3.

A modified embodiment of the pipe joint of the present invention used for connecting a pipe or pipes to a valve body is shown in FIGS. 3, 4 and 5. In these Figures, the numeral 101 denotes the main body of the valve to be connected to one or more pipes 102. At each place where a pipe 102 is to be connected, such as at the inlet and outlet, the valve body 101 is provided with a fitting element 103 having an internal opening whose diameter conforms to that of the pipe 102. The element 103 has a male threaded outer surface 104 and a tapered inner surface 105 as well as a shoulder 110 contiguous to said tapered surface and adapted for engaging the end of the pipe 102. A nut 108 has a female threaded part 106 mating with the male threaded part 104 of the element 103, and an inner tapered surface 107. A thin-walled flat sleeve packing 109 made of metallic material is sleeved on the end of the pipe 102 and is interposed between the tapered part 105 of the element 103 and the tapered part 107 of the nut 108. When mounting the pipe joint to the valve element, the nut 108 and then the metallic packing ring 109 are sleeved on the end of the pipe 102 so that said ring is positioned in a gap between the tapered part 105 of the element 103 and the tapered part 107 of the nut 108, that is, in the gap between the end of the pipe 102 placed against the shoulder 110 of the valve element 103 and the tapered part 105 of the element 103. Then the metallic packing ring 109 is tightened by screwing the female threaded part 106 of the nut onto the male threaded part 104 of the element 103. The metallic packing 109 is pressed at both its ends against the periphery of the pipe 1 and is bent into an arcuate shape at the intermediate zone so as to abut against the tapered surfaces 105, 107, thus completely sealing the pipe 102 at the connecting zone with the valving element 101.

A fluid leakage test for the pipe joints of this invention was conducted under the following conditions:

Working pressure: 17.5 Kg/cm$^2$

Parts used for the test: 10 stainless steel joints, 5 pipes, 1 tee and 1 elbow.

Test items: Hydraulic and pneumatic pressure tests.

It was shown from this test that the stainless steel joints designed and constructed in accordance with the present invention could withstand a hydraulic pressure of 26.5 Kg/cm$^2$ for 30 min. and a pneumatic pressure of 12.0 Kg/cm$^2$ for 15 min. without any trouble in their performance.

In accordance with this invention, the pipes can be joined together completely in a simple way owing to the arcuate deformation of the metallic packing. Moreover, worn packing rings can be replaced easily with new ones. The pipe joint of this invention is durable and can be used effectively for connecting pipes intended for air conditioning and transport of service water and waste water.

In addition, the ring packing 9 is compressed axially as the metallic packing 10 is clamped and bent into the arcuate shape, so as to completely seal the liquid from the annular space 12 and prevent the risk of corrosion.

The embodiments of the invention in which an exclusive property or privilege is claimed are defined as follows:

1. A pipe joint, comprising: a metal pipe having an unthreaded end; a metal body member having a tubular socket for receiving said unthreaded end of said metal pipe, said tubular socket having an internal shoulder at its inner end and an annular, resilient, compressible packing ring seated on said shoulder and sealingly engaged with said one of said metal pipe, said tubular socket being defined by an annular axially extending flange projecting away from said shoulder and encircling said end of said pipe, said flange having a threaded portion on its external wall, the internal wall of said flange consisting of an axially outer portion which tapers in a direction from the axially outer end of said flange partway toward said shoulder and an axially inner portion which extends from the inner end of said outer portion to said shoulder, said axially inner portion of said internal wall being of substantially uniform diameter throughout its length and being disposed in surrounding and radially outwardly spaced relationship to said pipe; a metal nut sleeved on said pipe and having a threaded first internal wall portion threadedly engaged with said threaded portion of said flange and a tapered second internal wall portion spaced axially outwardly from said first internal wall portion and tapering in an axially outward direction; a thin-wall, flat, metal packing sleeve surrounding said pipe and having the opposite end portions of its external surface in surface-to-surface contact with said tapered second internal wall portion of said nut and said tapered axially outer portion of the internal wall of said flange, said sleeve being concavo-convex in axial cross-section and having its opposite axial ends plastically deformed and pressed against the exterior surface of the pipe along two axially spaced circumferentially extending lines of contact with the interior surface of said pipe being free from internal support at said lines of contact, other portions of said sleeve being elastically deformed so that the sleeve can elastically spring back when said nut is unthreaded from said body member, the inner axial end of said sleeve extending inwardly beyond the inner end of said axially outer portion of the internal wall of said flange and into the space between said axially inner portion of the internal wall of said flange and said pipe, the edge of said inner axial end of said sleeve biting into and forming an annular groove in the exterior surface of said pipe.

2. A pipe joint as claimed in claim 1, in which said body member has two corresponding sockets projecting in opposite axial directions from said shoulder, there being a pipe, a nut and a sleeve associated with each socket.

3. A pipe joint, as claimed in claim 1, in which said pipe, said body member and said nut are made of the same metal.

4. A pipe joint, comprising: a metal pipe having an unthreaded end; a metal body member having a tubular socket for receiving said unthreaded end of said metal pipe, said tubular socket having an internal shoulder at its inner end, said tubular socket being defined by an annular axially extending flange projecting away from said shoulder and encircling said end of said pipe, said flange having a radially extending end wall at the outer axial end thereof and a threaded portion on its external wall, the internal wall of said flange consisting of an elongated axially outer portion of substantially the same length as said threaded portion of said external wall and which extends from said radial end wall and tapers at a small angle in a direction from said end wall of said flange partway toward said shoulder and an axially inner portion which extends from the inner end of said outer portion to said shoulder, said axially inner portion of said internal wall being of substantially uniform diameter throughout its length and surrounding said pipe; a metal nut sleeved on said pipe and having a threaded first internal wall portion threadedly engaged with said threaded portion of said flange, an elongated tapered second internal wall portion spaced axially outwardly from said first internal wall portion and tapering at a small angle in an axially outward direction, and a radially extending intermediate wall portion extending between the adjacent ends of said first and second internal wall portions and which is in confronting relationship to the radial end wall on said body member; a thin-wall, flat, metal packing sleeve surrounding said pipe, disposed radially inwardly of said intermediate wall portion and said end wall and having its external surface in surface-to-surface contact with said tapered second internal wall portion of said nut and said tapered axially outer portion of the internal wall of said flange along substantially the entire lengths thereof, said sleeve being concavo-convex in axial cross-section and having its opposite axial ends plastically deformed and pressed against the exterior surface of the pipe along two axially spaced circumferentially extending lines of contact with the interior surface of said pipe being free from internal support at said lines of contact, other portions of said sleeve being elastically deformed so that the sleeve can elastically spring back when the load applied thereon is removed, at least one of the axial ends of said sleeve biting into and forming an annular groove in the exterior surface of said pipe.

5. A pipe joint as claimed in claim 4 including an annular, resilient, compressible packing ring of rectangular cross-section seated on said shoulder and sealingly engaged with said end of said metal pipe, said ring being of greater radial thickness than said pipe and extending both radially outwardly and radially inwardly from said pipe, and said end of said pipe forms an annular groove in the confronting end wall of said packing ring.

* * * * *

UNITED STATES PATENT OFFICE
CERTIFICATE OF CORRECTION

Patent No. 3,917,324  Dated November 4, 1975

Inventor(s) Hiroe Wakatsuki and Toshio Nishimura

It is certified that error appears in the above-identified patent and that said Letters Patent are hereby corrected as shown below:

Col. 5, line 22; change "one" to ---end---.

*Signed and Sealed this*

*twenty-third* Day of *March 1976*

[SEAL]

Attest:

RUTH C. MASON
*Attesting Officer*

C. MARSHALL DANN
*Commissioner of Patents and Trademarks*